UNITED STATES PATENT OFFICE.

CHARLES S. EDWARDS, OF RUSHVILLE, ILLINOIS.

IMPROVEMENT IN PRESERVING POTATOES.

Specification forming part of Letters Patent No. 4,337, dated December 31, 1845.

*To all whom it may concern:*

Be it known that I, CHARLES SEPTIMUS EDWARDS, of Rushville, in the county of Schuyler and State of Illinois, have invented a new Mode of Preserving Potatoes; and I do hereby declare that the following is a full, clear, and exact description.

My invention relates to a mode of preserving potatoes in a cooked or partially-cooked state by means of obtaining the substance of potatoes in a separated or finely-divided and dried state; and in order to give the best information in my power, I will proceed to describe the means pursued by me in carrying out my invention, and which I have found fully to answer.

The potatoes are first well washed and cleansed from dirt, and then boiled or steamed until the skins just show symptoms of cracking. They are then peeled or stripped of their skins, and the eyes and specks are carefully taken out. The potatoes are then put into a cylinder which is made of iron-plate tinned on the inner surface, such cylinder being closely pierced with small holes about one-eighth of an inch in diameter, and by the action of a powerful screw or other proper press a piston is caused to pass down in the cylinder, and the potatoes are caused to pass through the holes in the form of small threads or fibers, which retain the form in which they pass from the cylinder. The substances of potatoes thus separated is then spread evenly and thinly on hollow tables which are made of tinned iron and heated by steam to a varying temperature of from 100° to 160° of Fahrenheit, the lower temperature being applied as the substance of potatoes approaches a state of dryness. This variation in the temperature of the tables I obtain by regulating the supply-cocks that connect each table with the main or supply pipe from the boiler, the steam in the boiler being at a pressure of about ten pounds to the square inch. Thus by increasing or diminishing the quantity of steam in each table I obtain the desired heat. During the time the potato is on the tables it is constantly raked and moved about till it is thoroughly dry, and it may immediately after getting cold be packed in casks or otherwise.

Having thus described the nature of my invention and the best manner I am at present acquainted with for performing the same, I would have it understood that I make no claim to any of the apparatus herein described, nor do I confine myself thereto, although I consider the means above described the most simple and best for performing the invention; but

What I claim as my invention is—

The mode of preserving potatoes in a cooked or partially cooked state by means of obtaining the substance of potatoes in a separated or finely divided and dried state, as described.

CHARLES SEPTIMUS EDWARDS.

Witnesses:
B. F. WYNE,
RICHARD A. LESTER.